(12) United States Patent
Birumachi

(10) Patent No.: US 6,799,002 B2
(45) Date of Patent: Sep. 28, 2004

(54) FIXING APPARATUS FOR FUSING AND FIXING TONER IMAGE ON TRANSFER MATERIAL IN IMAGE FORMING APPARATUS

(75) Inventor: Takashi Birumachi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/273,337

(22) Filed: Oct. 18, 2002

(65) Prior Publication Data

US 2003/0086718 A1 May 8, 2003

(30) Foreign Application Priority Data

Oct. 23, 2001 (JP) ...................................... 2001-324698

(51) Int. Cl.[7] ............................................. G03G 15/20
(52) U.S. Cl. ......................................... 399/67; 399/330
(58) Field of Search ............................ 399/67, 69, 320, 399/328, 330, 335, 336, 338; 219/216

(56) References Cited

U.S. PATENT DOCUMENTS

| | | | | |
|---|---|---|---|---|
| 5,801,359 A | * | 9/1998 | Mano et al. | 399/335 X |
| 5,819,150 A | * | 10/1998 | Hayasaki et al. | 339/330 |
| 6,037,576 A | * | 3/2000 | Okabayashi et al. | 399/330 X |
| 6,181,905 B1 | * | 1/2001 | Ohta et al. | 399/328 |
| 6,278,852 B1 | * | 8/2001 | Hayashi | 219/216 X |
| 6,545,255 B2 | * | 4/2003 | Sato et al. | 399/330 X |

* cited by examiner

*Primary Examiner*—Sandra L. Brase
(74) *Attorney, Agent, or Firm*—Fitzpatrick, Cella, Harper & Scinto

(57) ABSTRACT

The invention provides a fixing apparatus including a coil for generating a magnetic field; a heating medium having an electroconductive layer which generates heat by an eddy current by the magnetic field generated by the coil, and adapted to fix an unfixed toner image borne on a recording material by heat; a temperature detecting member for detecting the temperature of the heating medium; a semiconductor switch element for executing an on-off current supply to the coil; and a capacitor connected electrically parallel to the coil; wherein the capacitor executes charging and discharging, and an on-period from the semiconductor switch element to the coil is controlled according to the output of the temperature detecting member.

12 Claims, 13 Drawing Sheets

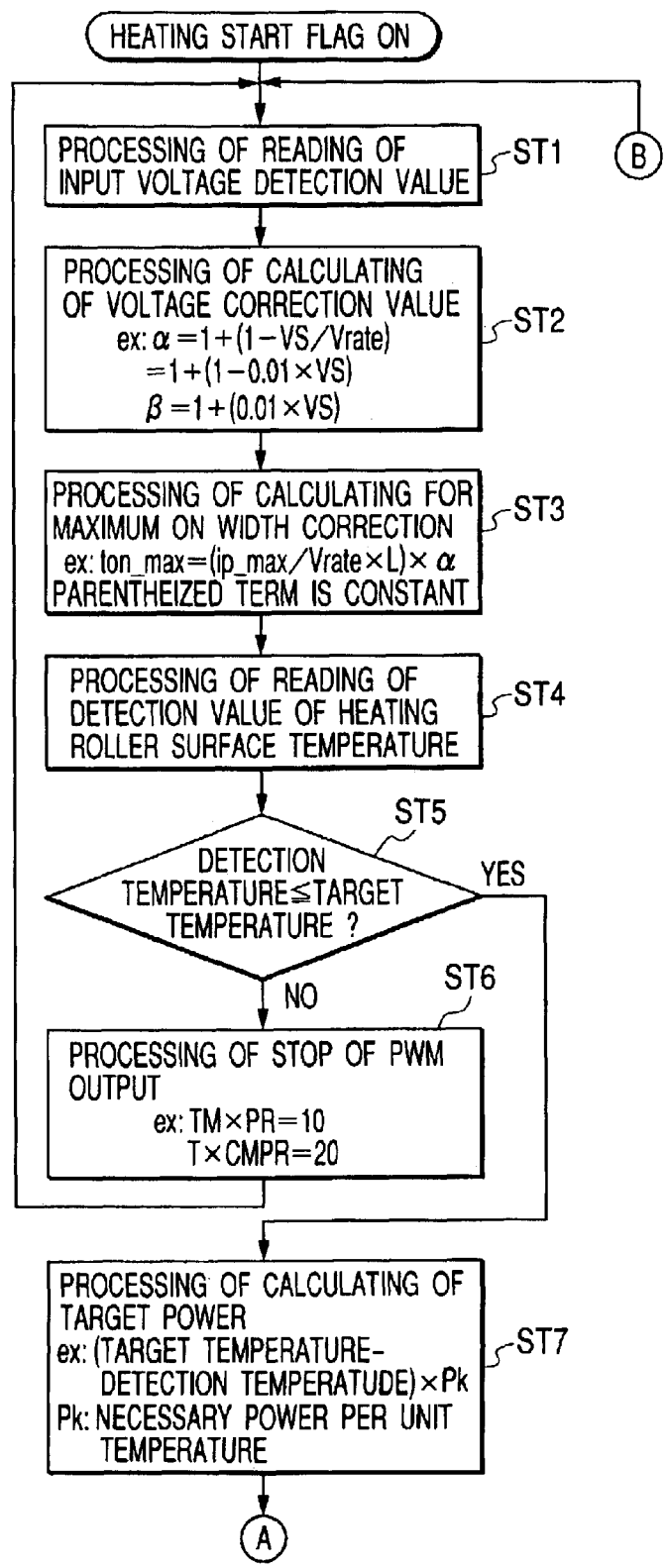

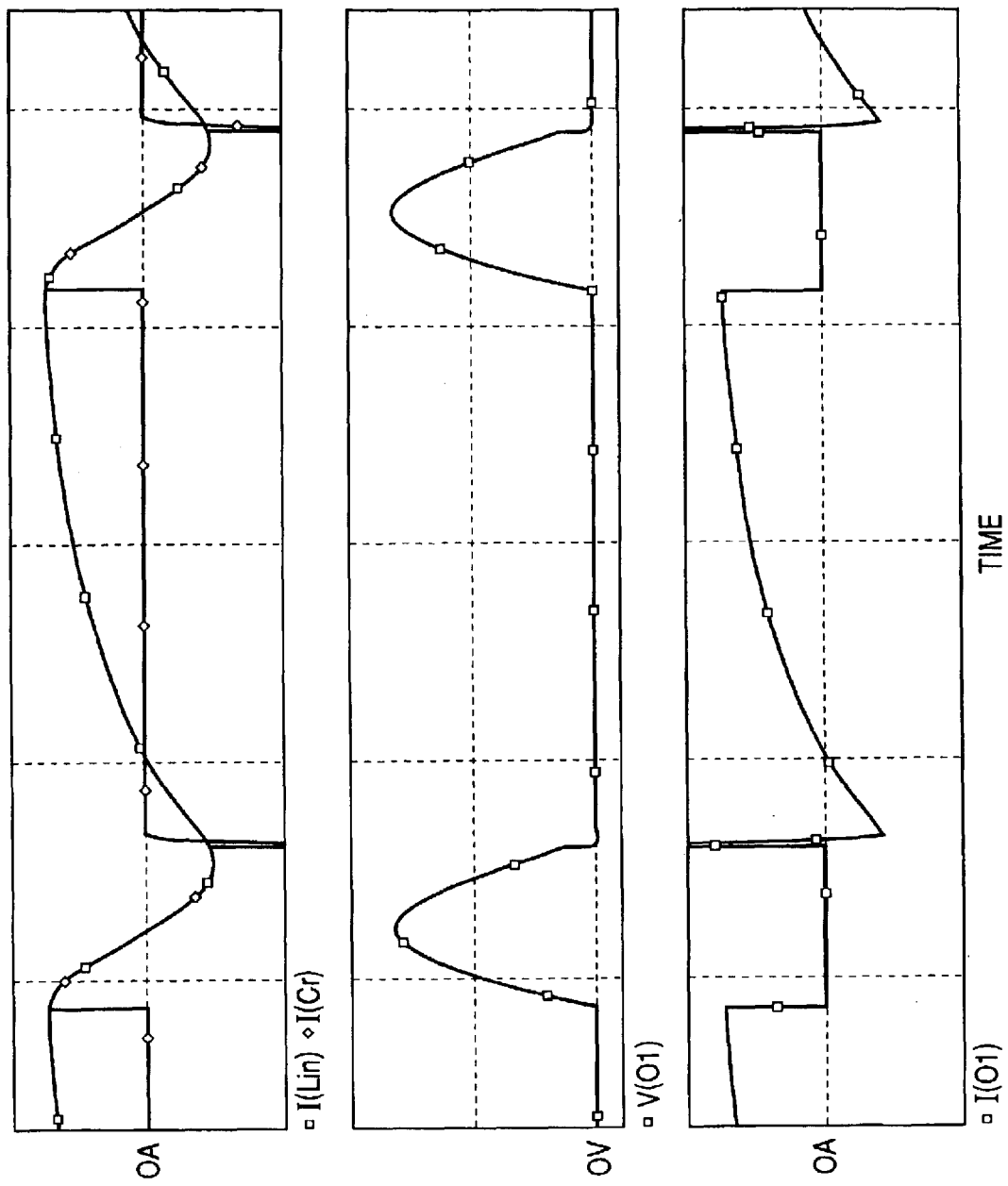

FIXING APPARATUS FOR FUSING AND FIXING TONER IMAGE ON TRANSFER MATERIAL IN IMAGE FORMING APPARATUS

BACKGROUND OF THE INVENTION

1. Field of the Invention

The present invention relates to a fixing apparatus utilizing induction heating as a heat source, a heat fixing apparatus for heat fixing a toner image, formed on a recording sheet, with a thermally fusible material such as toner as a developer, onto such recording sheet, and an image recording apparatus of electrophotographic system such as a copying apparatus, a printer or a facsimile, utilizing such heat fixing apparatus.

2. Related Background Art

In an image forming apparatus such as an electrophotographic apparatus, there is provided image forming means which utilizes a developer (toner) to form a toner image on a recording sheet, and the recording sheet bearing the toner image is conveyed, by sheet conveying means, in a heat fixing apparatus 801 shown in FIG. 14, in a direction indicated by an arrow whereby the toner image 811 is fixed by heat and pressure onto the recording sheet 810.

In the heat fixing apparatus 801, a heating roller 802, opposed and pressed to a pressure roller 803, is provided therein with a halogen heater 804 as a heat source, and the pressure roller 803 and the heating roller 802 are rotated in a direction indicated by an arrow by an unrepresented drive source.

FIG. 15 illustrates a temperature regulation circuit for regulating the surface of the heating roller at a predetermined temperature, wherein a control signal generation unit 901 compares a detection output of a temperature sensor 905 with a reference signal Vr by a comparator 904 to output an on/off signal, and a switching unit 902 turns on and off a connection circuit for the halogen heater 804 and an AC power source 903 in response to the aforementioned on/off signal thereby regulating the temperature of the halogen heater 804.

In the above-mentioned temperature regulation system for the heating roller 802 by the on-off control of the halogen heater 804, since the system is based on indirect heating of the heating roller 802 by radiation heat, a part of the generated heat is lost by convection heat and the amount of heat radiation becomes large because the entire heating roller is uniformly heated, so that the system is associated with drawbacks of a very poor heat efficiency and a large electric power consumption.

Also in order to obtain stable fixing ability, the fluctuation in temperature of the heating roller 802 has to be made small, whereby a heating roller 802 of a large heat capacity is required as a result. Consequently, in case of heating the heating roller 802 to a fixable temperature with an electric power available within the electric power consumption of the entire apparatus in a situation where the temperature of the heating roller is considerably lower than a target temperature, there is encountered also a drawback of requiring a long time, in relation also to the poor heat efficiency of the indirect heating.

An induction heating system is proposed for solving such drawbacks and realizing a high efficiency and a high-speed temperature elevating characteristics. In such induction heating system, a high frequency magnetic field generated by supplying an excitation coil with a high frequency current is applied to a surfacial layer of the heating roller to generate an eddy current in an electroconductive layer at the surface of the heating roller, thereby directly heating the heating roller by a Joule's heat generated by such eddy current, whereby a high heat generating efficiency is realized and a high-speed temperature elevation is rendered possible. Also, since the amount of heat generation is proportional to the supplied electric power, the temperature of the heating roller can be controlled promptly and easily by a variable control of the electric power supply, and the electric power can be efficiently utilized to attain a saving of the electric power.

However, in order to supply the coil with a high frequency current, there is a method of converting a commercial alternating current of a low frequency into a high frequency, but such conversion of a low frequency into a high frequency is undesirable because the configuration of the electrical circuit inevitably becomes complex. Also in a fixing apparatus in which a recording material is passed, the heating medium has to be maintained at a predetermined temperature while the heat movement takes place frequently, so that a highly precise current supply is required.

For these reasons, there is being desired a method capable of generating a high frequency current by a simple electrical circuit.

SUMMARY OF THE INVENTION

An object of the present invention is not only to generate a high frequency current with a simple configuration but also to achieve further saving of the electric power while maintaining an appropriate temperature.

Another object of the present invention is to maintain an appropriate surface temperature of a heating medium while enabling a zero-voltage switching even in an environment where the electric power supply is reduced.

Still another object of the present invention is to enable a zero-voltage switching regardless of a fluctuation in the input voltage, thereby suppressing an electric power loss in a semiconductor switching element.

Still another object of the present invention is to provide an apparatus and an image forming apparatus, including a coil for generating a magnetic field, a heating medium provided with an electroconductive layer which generates heat by an eddy current caused by the magnetic field generated by the coil and is adapted to fix an unfixed toner image on a recording material by heat, a temperature detecting member for detecting the temperature of the heating medium, a semiconductor switching element for on-off control of a current supply to the coil, and a capacitor electrically connected in parallel to the coil, wherein the capacitor executes charging and discharging and the turn-on time from the semiconductor switching element to the coil is controlled according to the output of the temperature detecting member.

BRIEF DESCRIPTION OF THE DRAWINGS

FIG. 13A is a chart showing a current wave form in an LC resonance circuit at a zero-voltage switching;

FIG. 13B is a chart showing a voltage wave form between terminals of a semiconductor switching element;

FIG. 13C is a chart showing a current wave form of a conductor switching element;

DETAILED DESCRIPTION OF THE PREFERRED EMBODIMENTS

In the following, an embodiment of the present invention will be explained with reference to the accompanying drawings.

(Embodiment 1)

Figure 1:
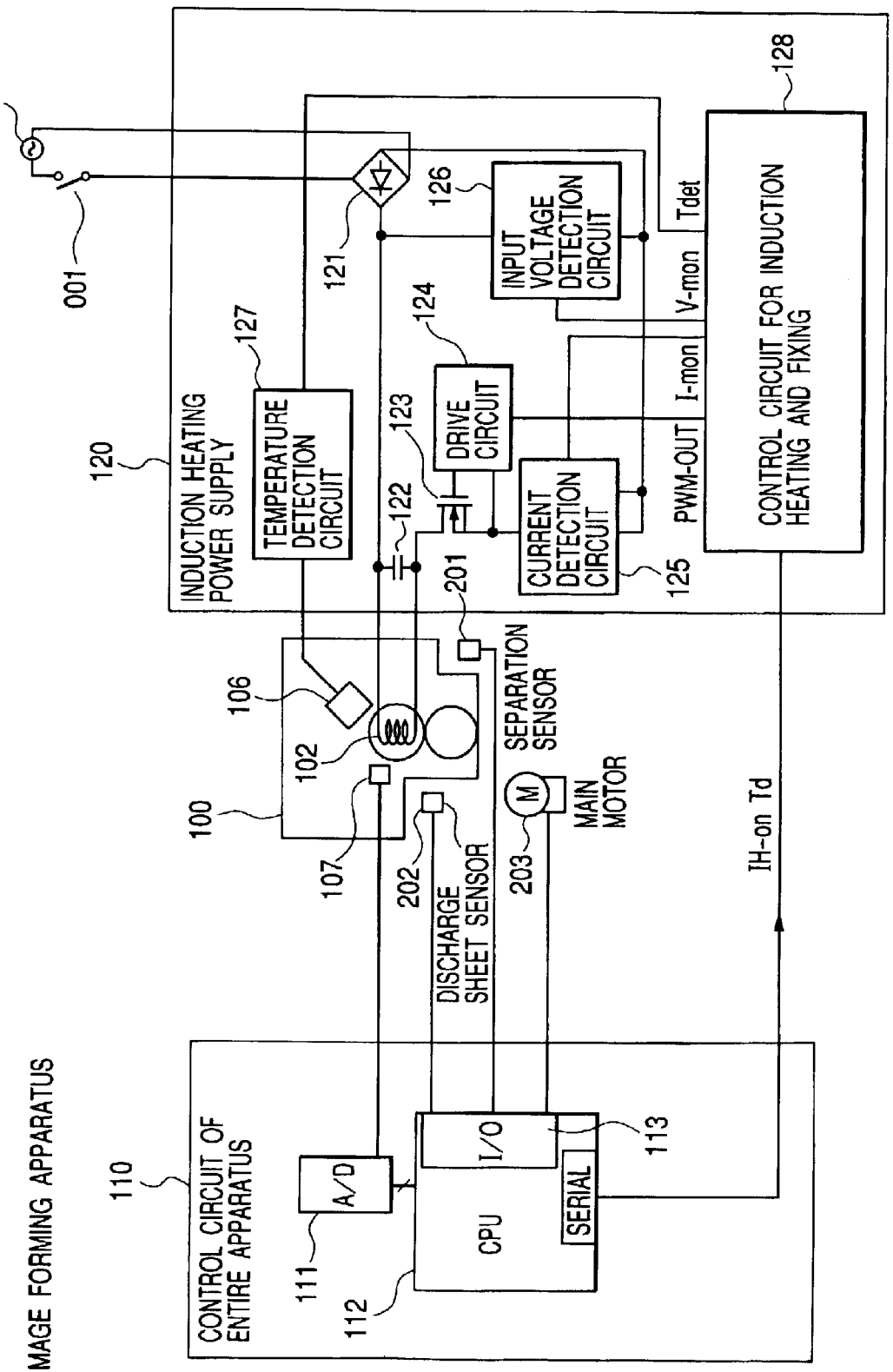
FIG. 1 is an entire block diagram of an embodiment 1 of the present invention.

FIG. 1 schematically shows an image forming apparatus in which a heat fixing apparatus of the present invention is applied. The image forming apparatus is principally composed of a heat fixing apparatus 100, a control circuit 110 for the entire image forming apparatus, and an induction heating power source 120.

There are shown a heating roller 101 constituting a heating medium, an excitation coil 102 constituting a coil for generating a magnetic field, a non-contact thermistor 106 constituting a temperature detecting member to be used for temperature control of the heating roller 101, and a thermistor 107 for detecting an over-heating of the heating roller, and these are principal units constituting the aforementioned heat fixing apparatus 100. There are also shown an A/D converter 111, a CPU 112 and an interface 113, and these are principal units constituting the control circuit 110 for the entire image forming apparatus.

There are also shown a rectifying diode 121 for rectifying an AC voltage from a commercial alternating power source 002, a resonance capacitor 122, a semiconductor switching element 123 for on-off controlling the current supply to the coil, a drive circuit 124 for driving the semiconductor switching element 123, a current detection circuit 125 for detecting the current amount in the switching element, an input voltage detection circuit 126 constituting voltage detection means for detecting the voltage of a commercial alternating power source, an induction heating fixation control circuit 128 for supplying the excitation coil 102 with a high frequency electric power, and a temperature detection circuit 127 for calculating the surface temperature of the heating roller 101 based on the detection value of the non-contact thermistor 106, and these are principal units constituting the induction heating power source 120. The thermistor may also be of a contact type.

In the following there will be given an explanation schematically on the function of the control circuit 110 for the entire apparatus.

The image forming apparatus is given an electric power supply from the commercial AC power supply 002 when a main switch 001 is turned on, whereupon a power supply is initiated from an unrepresented DC power source to the control circuit 110 for the entire apparatus and a sequence control of the apparatus is executed by the CPU 112 on the basis of programs and data stored in unrepresented ROM and RAM.

Thus, after activation, or in response to an image formation request signal from the exterior to the image forming apparatus, the CPU 112 executes a serial electrostatic copying operation including sheet feeding, image formation, fixation, sheet discharge etc. according to a program stored in an unrepresented ROM and based on detections and controls by various units (main motor 203, sheet discharge sensor 202, separation sensor 201), and also transmits data of a predetermined target temperature and an operation start signal to the induction heating control circuit 128 of the induction heating power source 120, thereby executing a heating operation.

Figure 2:
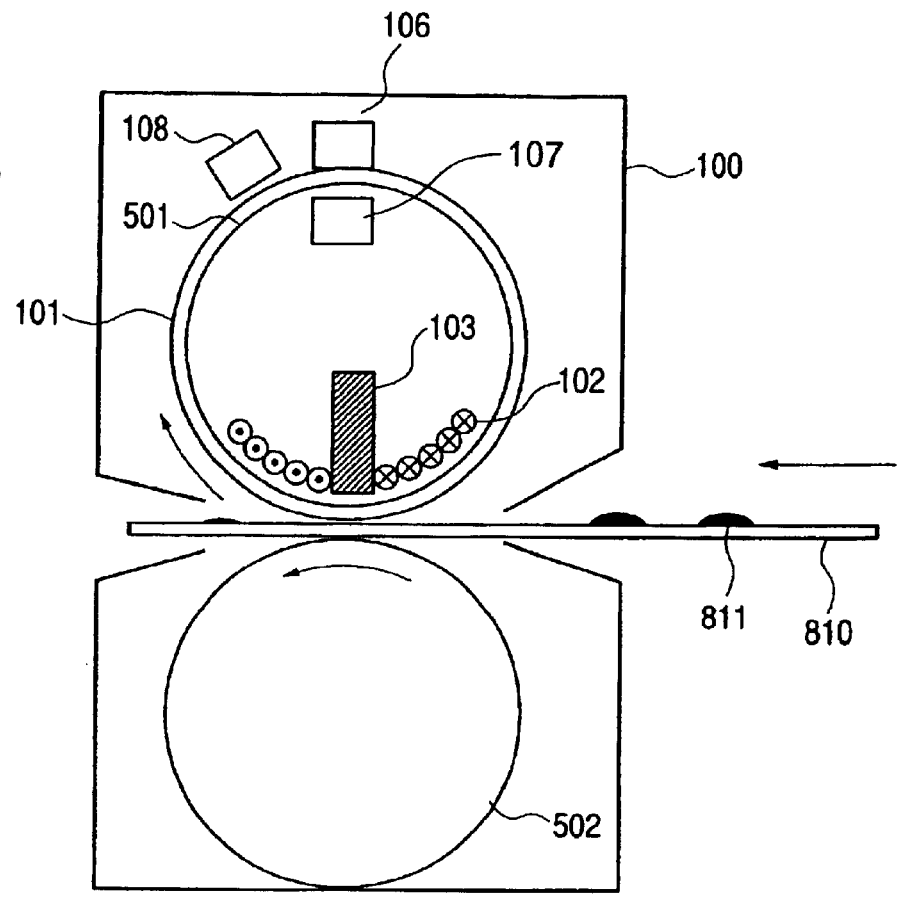
FIG. 2 is a view showing the configuration of a heat fixing apparatus of the embodiment 1 of the present invention.
Figure 3:
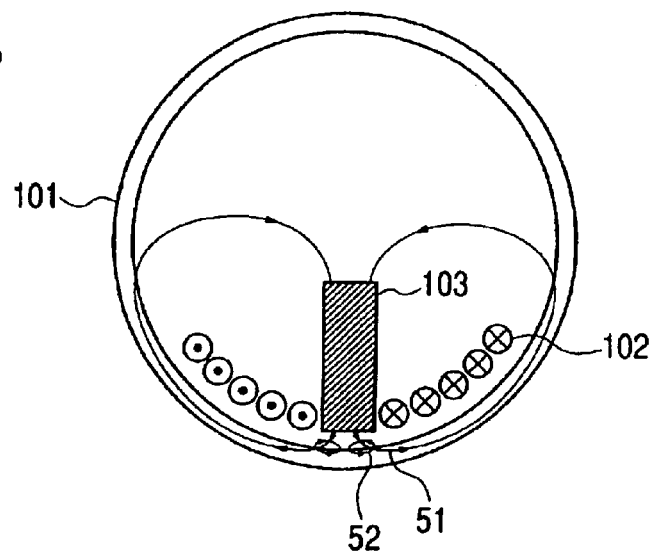
FIG. 3 is a view explaining the induction heating in the embodiment 1 of the present invention.

FIG. 2 shows the configuration of the heat fixing apparatus 100 employed in the present embodiment, and FIG. 3 shows a simplified explanation of the principle of heating. FIG. 2 is a lateral view of the heat fixing apparatus 100.

The heating roller 101 is a hollow iron roller provided with a surface treatment 501 such as a resin coating or a metal plating, in order to increase the releasing property of the surface. In the interior of the heating roller 101, a magnetic circuit composed of an excitation coil 102 and an I-shaped core (hereinafter called I-core) 103 is provided in the longitudinal or axial direction of the heating roller 101, wherein the excitation coil 102 is so positioned as to surround the I-core 103.

The I-core 103 is composed for example of ferrite having a high magnetic permeability, whereby the magnetic field generated by the excitation coil 102 can be effectively applied to the surface of the heating roller. In the drawing, in circles representing the wound wires of the excitation coil 102, those marked with dots "•" or with crosses "x" are respectively passed by a current of a same direction.

The heating operation is executed by applying an AC power to the excitation coil 102 as shown in FIG. 3, thereby generating an AC magnetic field 51 and inducing an eddy current 52 on the surface of the opposed heating roller 101. The eddy current 52, flowing on the surface of the heating roller, generates a Joule's heat on the surface of the heating roller by an intrinsic resistance thereof, whereby the surface of the heating roller executes spontaneous heat generation. In this operation, the magnetic field is concentrated on the I-core 103 of a high magnetic permeability, whereby a large heat generation by the eddy current is induced in a portion of the heating roller 101 opposed to the I-core 103. The AC magnetic field and the Joule's heat thus generated increase as the electric power supplied to the excitation coil 102 increases.

In this manner, the heating roller 101 generates heat to the predetermined temperature, and, by passing a recording sheet 810 bearing a toner image 811 between the pressure roller 502 and the heating roller 101 which are rotated in a direction indicated by an arrow by a drive source not represented in FIG. 2, the toner image is fixed onto the recording sheet.

Figure 4:
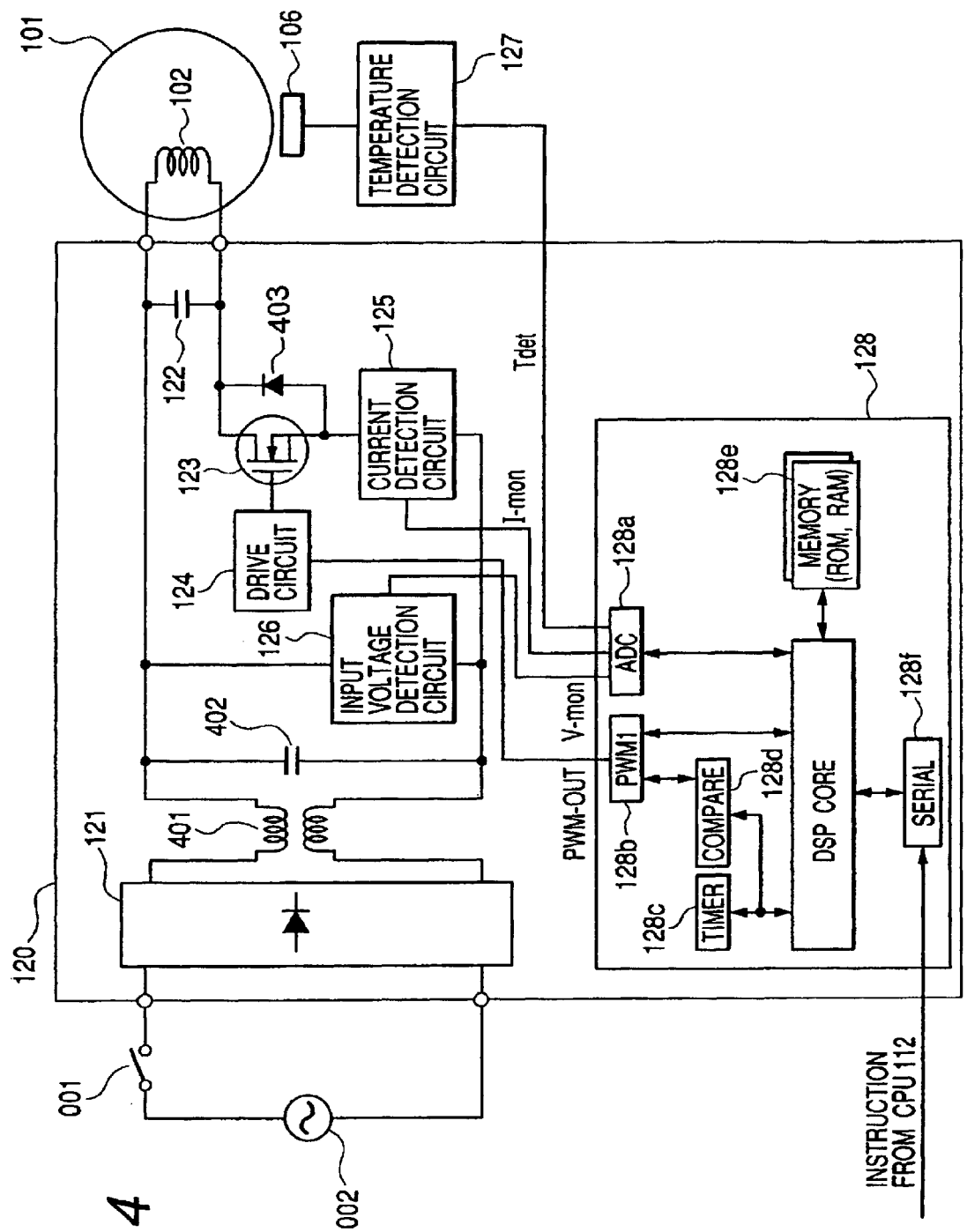
FIG. 4 is a block diagram of an induction heating apparatus of the embodiment 1 of the present invention.
Figure 5:
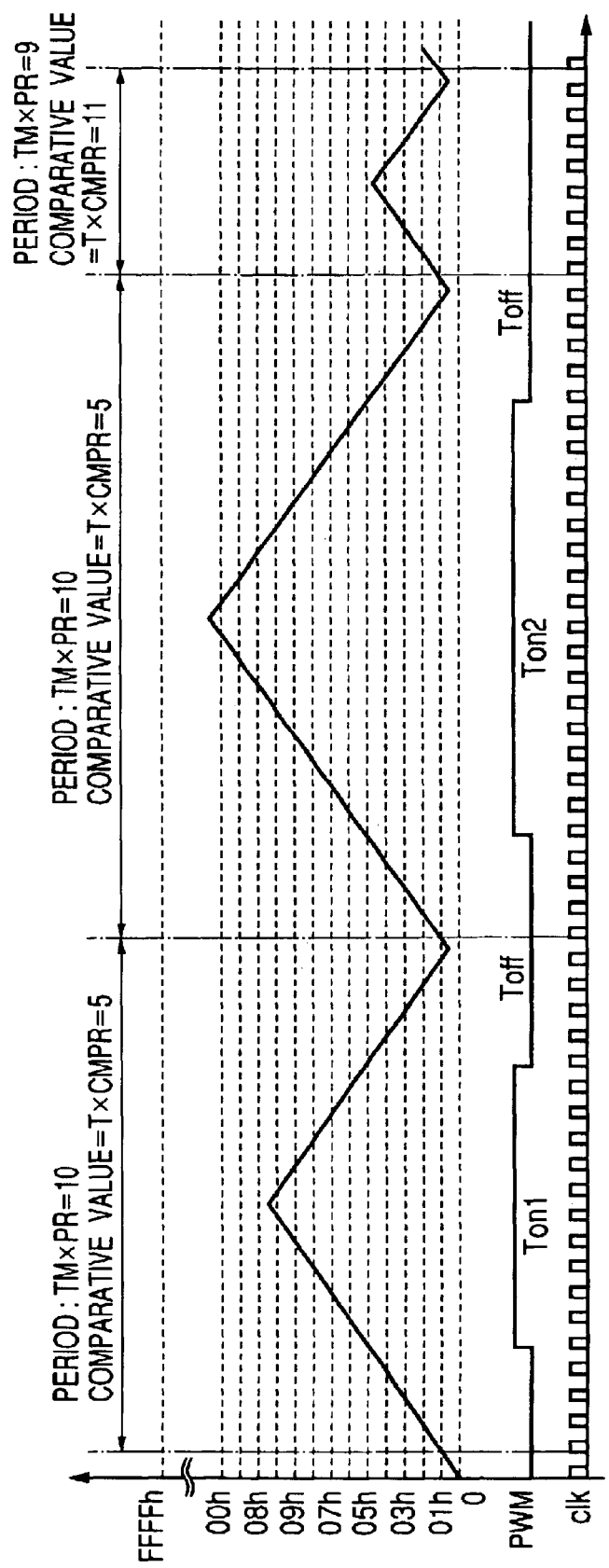
FIG. 5 is a chart explaining a PWM control signal generating method by a DSP in the embodiment 1 of the present invention.

FIG. 4 is a circuit diagram showing the configuration of the induction heating power source 120, and FIG. 5 is a flow chart showing a variable electric power control of electric power control means. The function will be explained in the following with reference to FIGS. 4 and 5.

When the commercial AC power source 002 is turned on by the power switch 001, the AC voltage is full-wave rectified by the rectifying diode 121. The full-wave rectified voltage is applied, through a common mode choke coil 401 and a capacitor 402 constituting a noise filter, between a parallel resonance circuit composed of the excitation coil 102 and a resonance capacitor 122, and the semiconductor switching element 123 connected serially to such parallel resonance circuit.

The induction heating control circuit 128 calculates the input electric power from the values obtained from the input voltage detection circuit 126 and the coil current detection circuit 125, also obtains, through the temperature detection circuit 127, the data of the surface temperature of the heating roller 101 detected by the non-contact thermistor 106, further executes a comparison with the target temperature data from the CPU 112 of the control circuit 100 for the entire apparatus thereby determining the electric power to be supplied to the excitation coil 102, and generates a Pulse Width Modulation control signal (hereinafter called PWM signal) so as to bring the surface temperature of the heating roller 101 to the target temperature, thereby executing high-speed on-off control of the semiconductor switching element 123 by the drive circuit 124.

When the semiconductor switching element 123 is turned on, the rectified input voltage is applied to the excitation coil 102. When the semiconductor switching element 123 is turned off, an inverse electromotive force is generated in the excitation coil 102 according to the current level during the on-state, and such inverse electromotive force causes charging of the resonance capacitor 122 connected in parallel.

Thus the terminal voltage of the resonance capacitor 122 increases in sinusoidal manner by a resonance function of the excitation coil 102 and the resonance capacitor 122, and reaches a maximum voltage when the energy accumulated in the excitation coil 102 is exhausted. When the charged voltage in the resonance capacitor 122 reaches the maximum voltage, then a reverse current flow is generated from the resonance capacitor 122 to the excitation coil 102 whereby the voltage of the resonance capacitor 122 is lowered. When the terminal voltage of the capacitor 122 becomes zero or less, a parasite diode of the semiconductor switching element 123 or a flywheel diode 403 connected to the terminals thereof is turned on, whereby the terminal voltage of the semiconductor switching element 123 is clamped at the level of the forward voltage (0.6 to 1.0 V) of the diode. When the semiconductor switching element 123 is thereafter turned on again, there is repeated a cycle of a current generation in the excitation coil 102, whereby a high frequency AC current corresponding to the PWM signal continues to flow in the excitation coil 102 thereby generating a high frequency magnetic field.

The principle of heat generation of the heating roller 101 is as explained in the foregoing, and it is thus rendered possible to control the surface of the heating roller at an arbitrary temperature, by generating a PWM signal according to the detected temperature and thus driving the semiconductor switching element 123. In the present invention, with respect to the on-state and off-state of the semiconductor switching element 123, the PWM signal is controlled, in a heating start state and in an ordinary operation state, in such a manner as to maintain the off-period constant according to the input voltage detected by the input voltage detection circuit 126 and to variably regulate the on-period according to the surface temperature of the heating roller 101.

In the following there will be explained the regulating function for the on-period and the off-period.

The induction heating control circuit 128 is composed of a digital signal processor (DSP). In the following there will be given an explanation based, as illustrated, on an A/D converter (ADC) 128a for converting analog signals from detection circuits into digital signals, a timer unit (TIMER) 128c for determining the frequency of a PWM signal which is an on-off control signal for a semiconductor switching element (PWM1) 128b, a PWM unit composed of a comparator unit (Compare) 128d for determining an on-off ratio, an interface 128f for serial communication, and a memory 128e (such as TMS320C24x series) integrally including a ROM and a RAM for storing programs and values from the detection circuits.

The PWM signal for controlling the on-off drive of the semiconductor switching element 123 is generated by setting, in the timer unit 128c and the comparator unit 128d constituting the PWM unit as shown in FIG. 5, a switching period value in a timer period register TM×PR of the timer unit 128c and a comparison value for the on-off ratio in a T×CMPR register of the comparator unit 128d. More specifically, a count within a range of 0h to FFFFh, set in the TM×PR register as illustrated, is defined as a cycle period of the PWM signal. The levels of the on- and off-periods are selected by similarly setting a count with a range of 0h to FFFFh as the comparison value in the T×CMPR register. FIG. 5 shows that a PWM signal of a duty ratio of 50% is obtained in case of selecting the cycle period by TM×PR=10 and the comparison value by T×CMPR=5, and that the entire cycle period becomes the off-period in case of selecting the cycle period by TM×PR=9 and the comparison value by T×CMPR=11. (For the purpose of simplicity, the value for the timer periods are shown by small numbers, but in practice they are so set that the maximum on-period at the largest electric power becomes the maximum period corresponding to FFFFh.) The duty ratio is defined by (on-period/(on-period+off-period)) within a cycle period.

Figure 7:
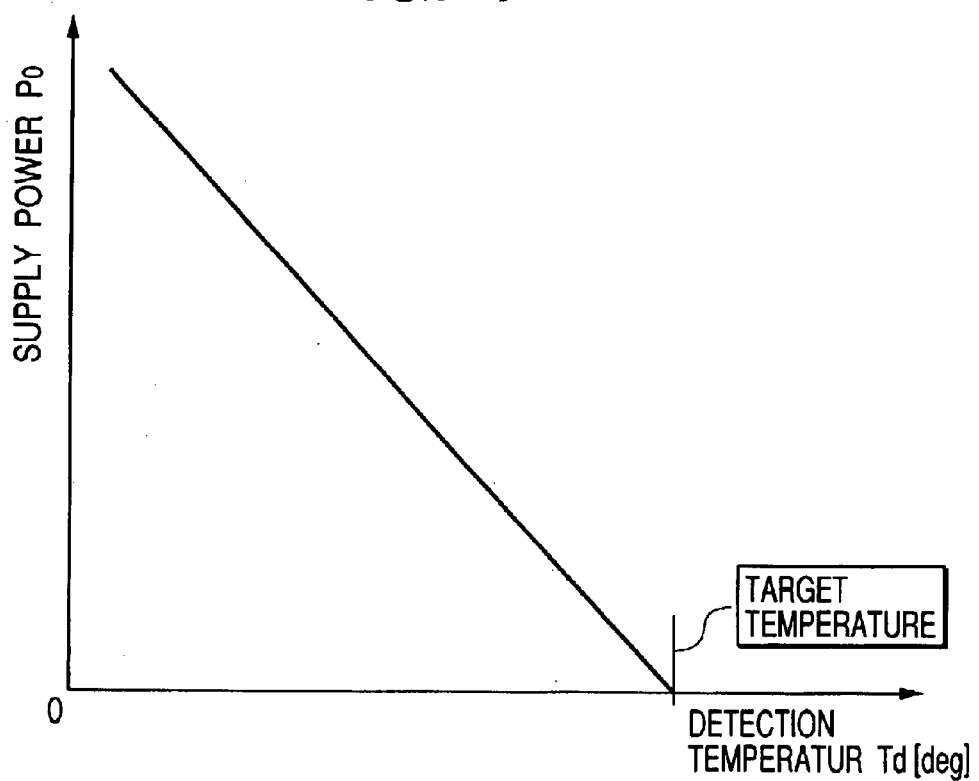
FIG. 7 is a chart showing the relationship between the surface temperature of a heating roller and an electric power supply.

The set values can be changed for every cycle period, and the increase-decrease control of the supplied electric power Po is achieved, as shown in FIG. 7, by calculating a target electric power required for heating according to the difference between the surface temperature of the heating roller 101 detected by the thermistor 106 and the target temperature, also integrating the supplied electric power based on the values obtained from the input voltage detection circuit 126 and the coil current detection circuit 125, then calculating, by the induction heating control circuit 128, the on-period of the semiconductor switching element

123 in such a manner that the supplied electric power reaches the target electric power, and setting such on-period in the timer period register TM×PR thereby changing the on-period.

In this manner there can be adopted a frequency modulation control which employs a voltage resonance inverter including a resonance circuit composed of the excitation coil and the capacitor connected thereto in parallel, and which achieves variable control of the supplied electric power by maintaining the off-period of the semiconductor switching element constant and varying the on-period thereof thereby controlling the high frequency current in the excitation coil.

As explained in the foregoing, charging and discharging of the capacitor, electrically connected parallel to the coil, induces a current in the coil, thereby causing heat generation in the heating medium to achieve effective utilization of energy. Also in case the difference between the surface temperature of the heating medium and the target temperature becomes large, a current is supplied anew to the coil thereby enabling to maintain the surface temperature of the heating medium with a simple configuration.

(Embodiment 2)

The embodiment 1, in which the off-period of the semiconductor switching element 123 is maintained constant, leads to a following drawback.

Figure 12A:
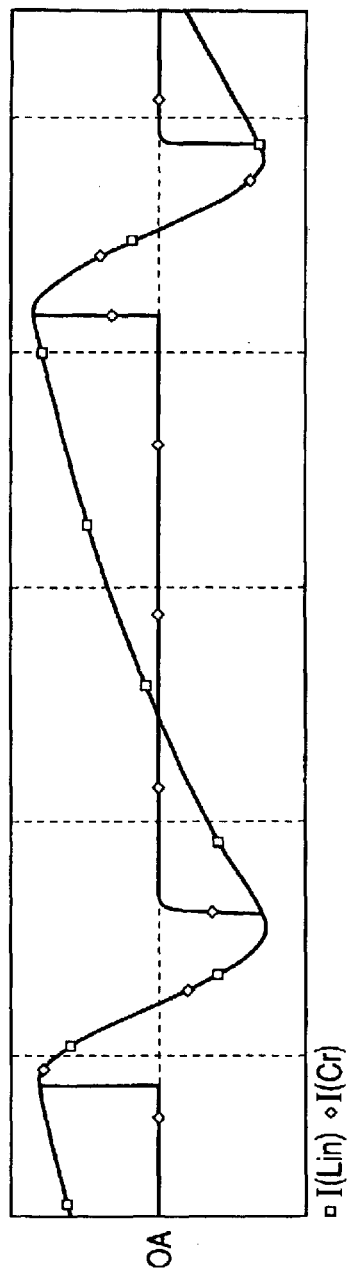
FIG. 12A is a chart showing a current wave form in an LC resonance circuit at a zero-voltage switching.
Figure 12B:
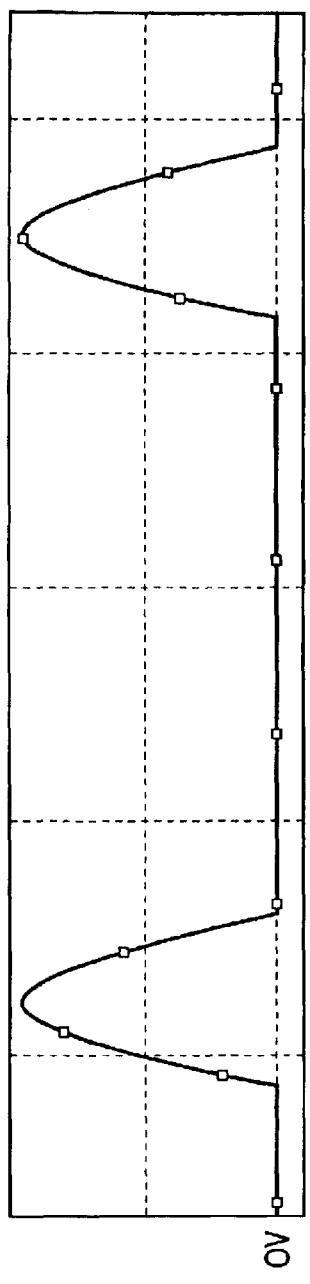
FIG. 12B is a chart showing a voltage wave form between terminals of a semiconductor switching element.
Figure 12C:
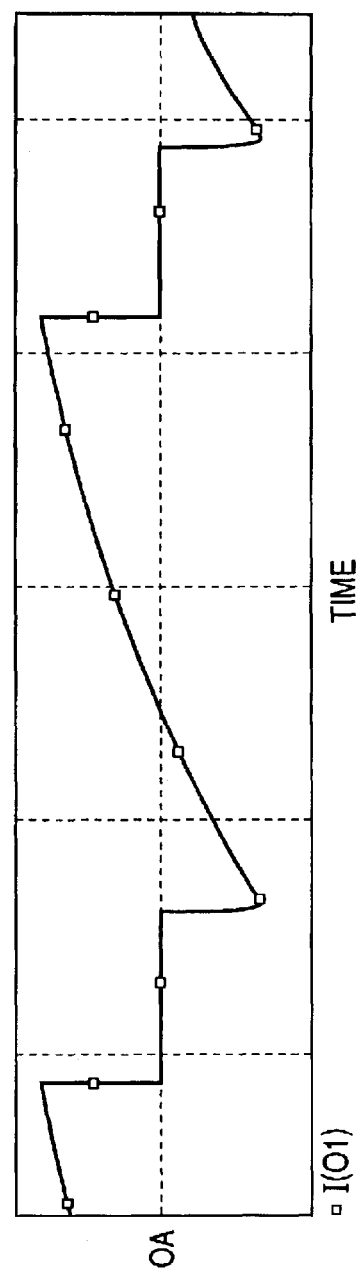
FIG. 12C is a chart showing a current wave form of a conductor switching element.
Figure 14:
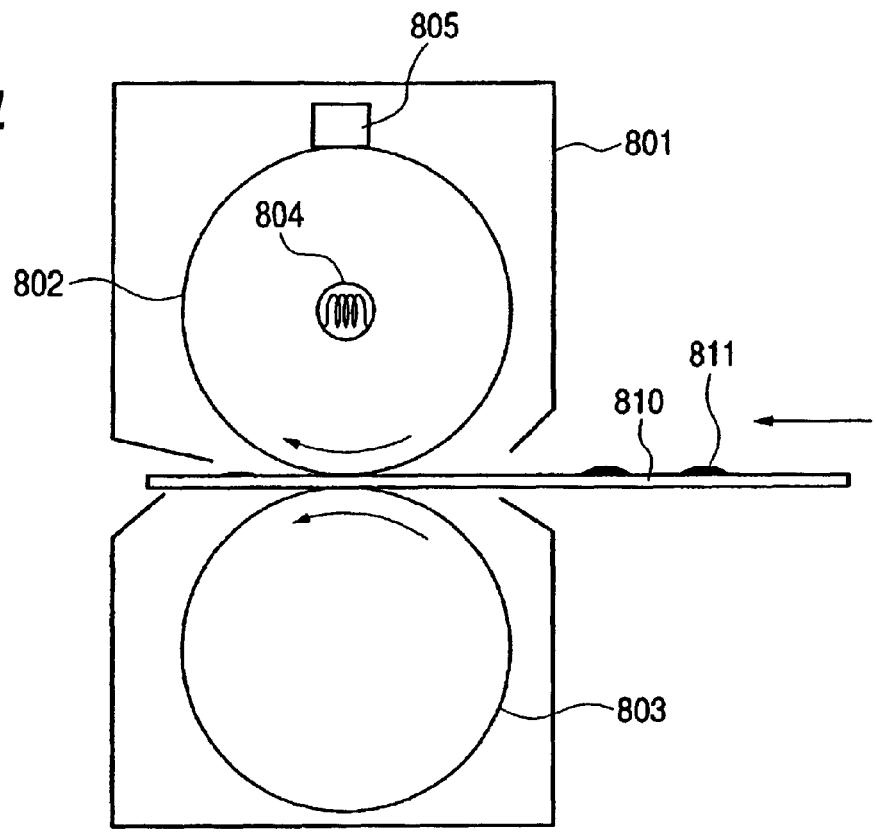
FIG. 14 is a view showing the configuration of a conventional heat fixing apparatus.
Figure 15:
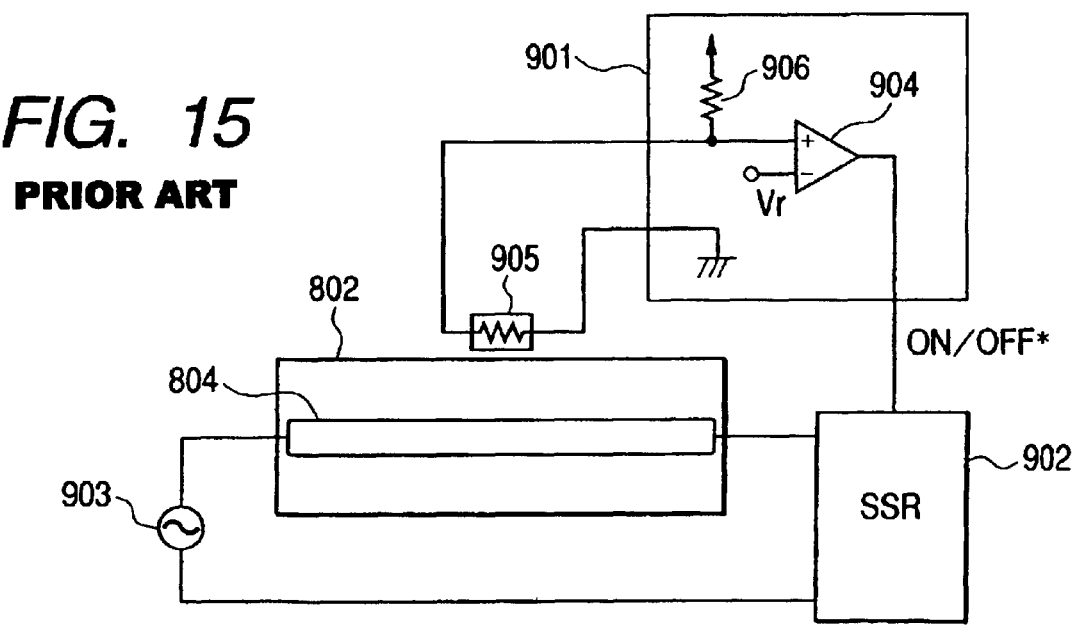
FIG. 15 is a view showing the temperature control configuration of a conventional heat fixing apparatus.

The aforementioned voltage resonance inverter is featured by an advantage that the loss at the switching is basically not generated, since the switching operation can be achieved when the semiconductor switching element is turned on or turned off in a state where the terminal voltage of the switching element is zero, as shown in FIGS. 12A to 12C. FIG. 12A shows a current wave form in the LC resonance circuit in a zero voltage switching operation, FIG. 12B shows a voltage wave form across the semiconductor switching element, and FIG. 12C shows a current wave form of the semiconductor switching element. In an appropriate zero voltage switching operation, the electric power loss at the switching is not generated since the semiconductor switching element is turned on or off after the terminal voltage thereof becomes zero.

However, the zero voltage switching by a resonance function requires a condition represented by the following equation:

$$Vcp = Vin + IoZr \quad (1)$$

wherein Vcp is a wave height at a voltage resonance state, Vin is an input voltage, Io is an output current, Zr is an impedance ($=\sqrt{Lr/Cr}$) of the resonance circuit, Lr is an inductance of the coil and Cr is an electrostatic capacitance of the capacitor.

Based on this condition, a load condition for obtaining a zero voltage in the off-period is given by:

$$Io \geq Vin/Zr \quad (2)$$

so that a load current at least equal to a certain level is required for executing the zero voltage switching. If the impedance Zr is constant, the output electric power has to be equal to or higher than a certain value.

Stated differently, in such system, for example in a light-load state where the object of heating is already at the target temperature and the heat dissipation is limited for example by a low number of copies, the on-period has to be decreased in order to reduce the supplied electric power, so that a sufficient resonance energy cannot be secured below a certain electric power level. As a result, the time required by the terminal voltage of the semiconductor switching element to reach zero becomes longer than in a situation with sufficient resonance. Therefore, in a state where the off-period of the semiconductor switching element is maintained constant, the zero voltage switching cannot be executed and the loss in the semiconductor switching element increases significantly as shown in FIGS. 13A to 13C, eventually leading to a deterioration of the semiconductor switching element by heat generation or a thermal destruction thereof. FIG. 13A shows a current wave form in the LC resonance circuit in a zero voltage switching operation, FIG. 13B shows a voltage wave form across the semiconductor switching element, and FIG. 13C shows a current wave form of the semiconductor switching element, and these charts indicate that an excessive current flows in the switching element because the zero voltage switching cannot be executed, resulting an electric power loss at the turning-on of the element.

On the other hand, in case of starting the heating to the target temperature of about 200° C. in a state where the temperature of the heating roller is sufficiently low, such as after the start of power supply or at the start of a copying operation, the semiconductor switching element is driven with the maximum on-period. In case the resonance impedance is made larger so as to enable the zero voltage switching even in the aforementioned light-load state, the resonance voltage becomes excessively large, and exceeds the breakdown voltage of the semiconductor switching element. Further, in case the input voltage shows a variation by a fluctuation in the voltage of the AC power source, an excessively large current is induced in the semiconductor switching element also as a result of the drive with the maximum on-period, and such excessive voltage and current applied to the semiconductor switching element may result in a destruction thereof.

Therefore, the semiconductor switching element to be employed requires a maximum rating which has sufficiently large margins on the operation voltage and current at the rated input voltage, and such fact undesirably restrict the range of selection of the usable semiconductor switching element.

Consequently there is required a current supply method capable of achieving the zero voltage switching under any environment.

The present embodiment provides a configuration capable of such zero voltage switching, and, in the following, there will be given a detailed explanation on a function of variably regulating the switching frequency in the present embodiment.

The induction heating control circuit 128 has a configuration same as in the embodiment 1.

Also the PWM signal, for controlling the on-off drive of the semiconductor switching element 123, has a configuration same as in the embodiment 1.

The set values can be changed for every cycle period, and the increase-decrease control of the supplied electric power Po is achieved, as shown in FIG. 7, by calculating a target electric power required for heating according to the difference between the surface temperature of the heating roller 101 detected by the thermistor 106 and the target temperature, also integrating the supplied electric power based on the values obtained from the input voltage detection circuit 126 and the coil current detection circuit 125, then calculating, by the induction heating control circuit 128, the on-period of the semiconductor switching element 123 in such a manner that the supplied electric power reaches the target electric power, and setting such on-period in the timer period register TM×PR thereby changing the on-period.

Figure 8:
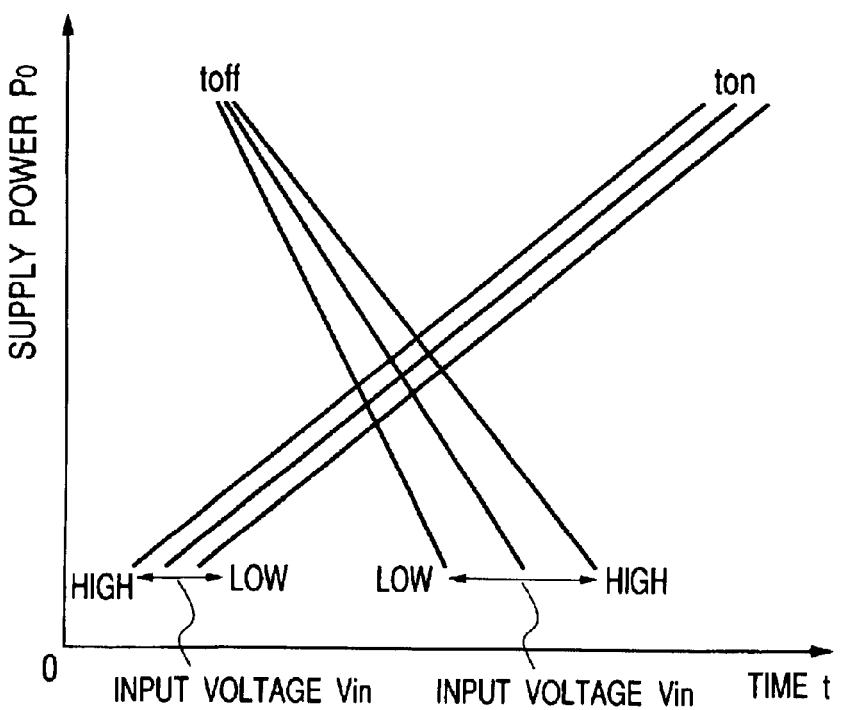
FIG. 8 is a chart showing a change in on-off periods of the electric power supply as a function of an input voltage in the embodiment 1.

In order to decrease the loss of the circuit as far as possible and to improve the efficiency, the supplied electric power Po and the on- and off-periods of the semiconductor switching element 123 assume a relationship shown in FIG. 8. This is because, for achieving zero voltage switching securely, the on-period becomes shorter for a higher input voltage as the current becomes less for a given supplied electric power, while the off-period has to be extended according to an increase in the time required by the terminal voltage of the semiconductor switching element 123 to reach zero.

Figure 6A:
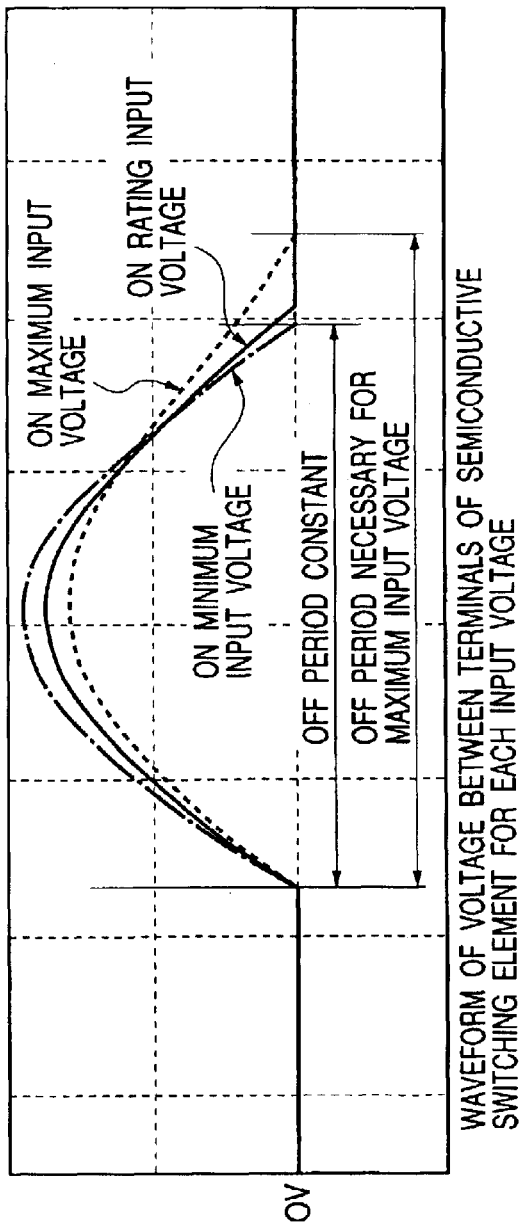
FIG. 6A is a chart showing a voltage wave form in a semiconductor element in a case without correction by an input voltage in an off-period.
Figure 6B:
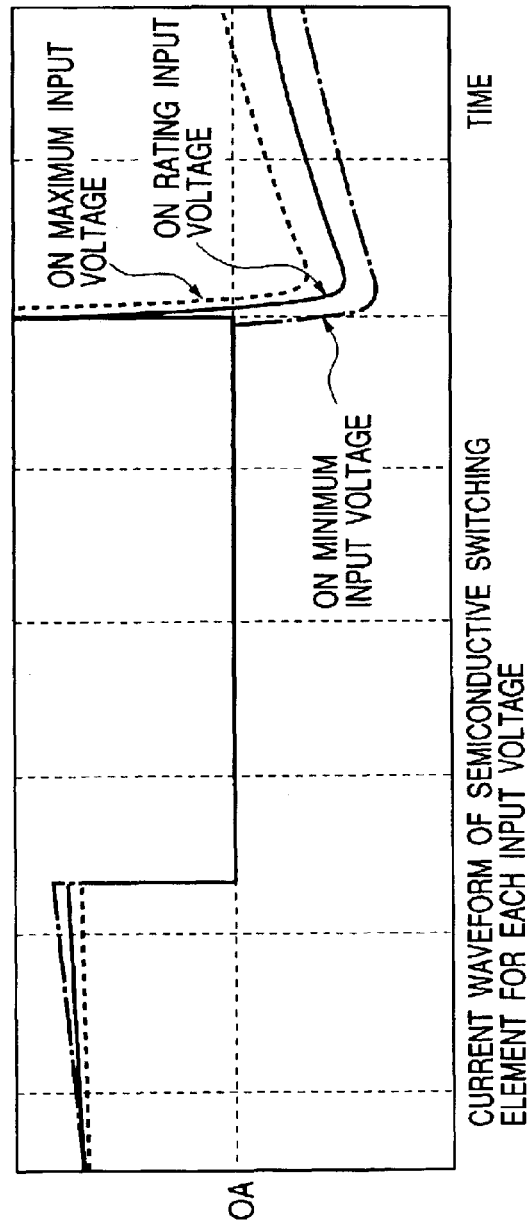
FIG. 6B is a chart showing a current wave form in a semiconductor element in a case without correction by an input voltage in an off-period.

As a reference, FIG. 6A shows the voltage wave form between the terminals of the semiconductor switching element 123 when the input voltage is varied with a fixed off-period under a same supplied electric power. FIG. 6A shows the terminal voltage of the semiconductor switching element at the switching, and FIG. 6B shows the current therein. These charts indicate, when the input voltage varies under a fixed off-period, the semiconductor switching element is turned on before the terminal voltage thereof reaches zero, so that an excessive current is induced at the turning-on of the semiconductor switching element thereby increasing the power loss therein.

As explained in the foregoing, the power loss increases significantly unless the off-period is corrected in response to a variation in the input voltage. Consequently there is executed a control of varying the T×CMPR register of the comparator unit 128c according to the detection value of the input voltage detection circuit 126.

Figure 9:
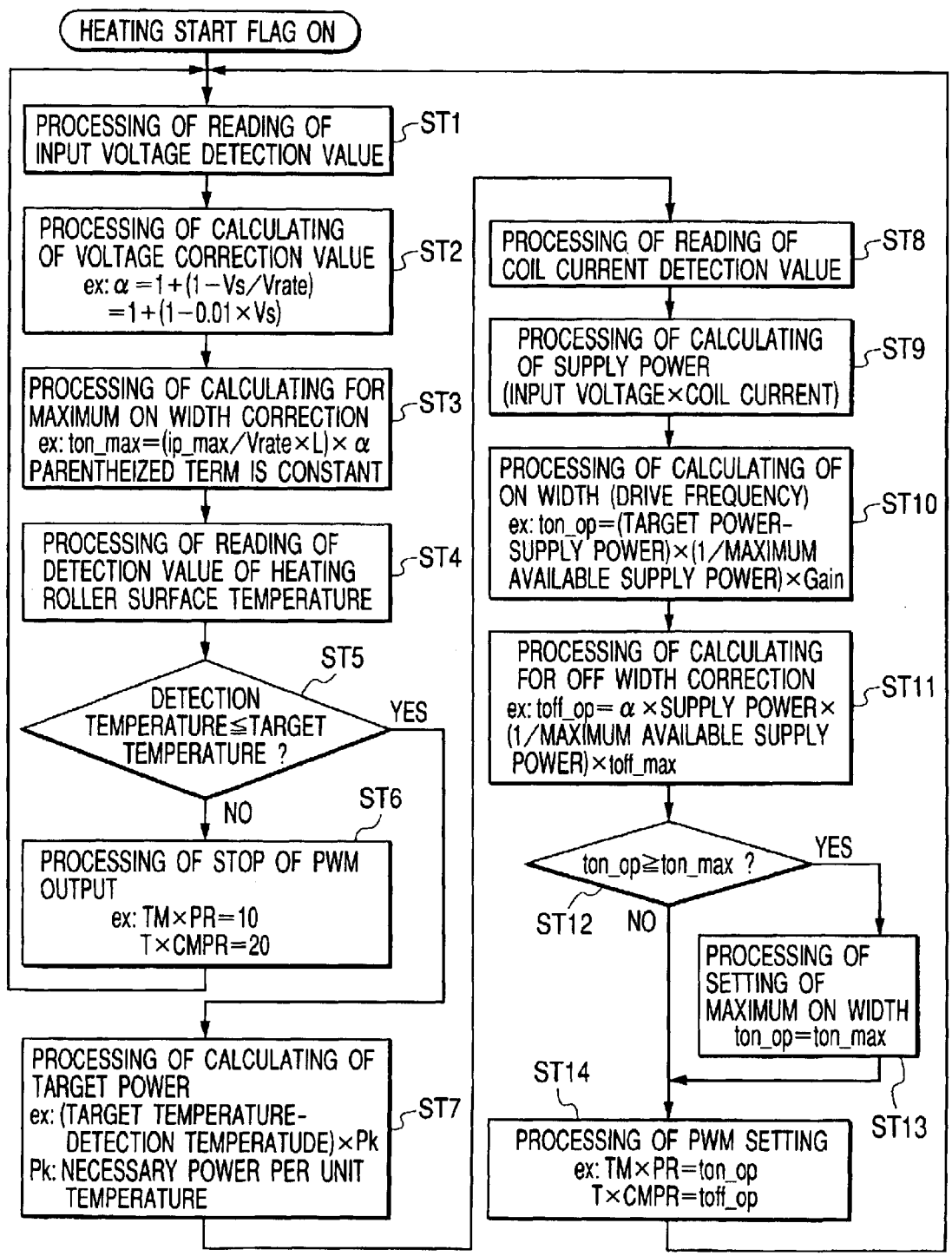
FIG. 9 is a flow chart showing the control procedure of the embodiment 1.

The above-mentioned control can be realized by a process shown by a flow chart in FIG. 9. Referring to FIG. 9, when a heating start flag is turned on, there are executed an input voltage detection value reading process ST1, a voltage correction value calculating process ST2 according to a following equation:

$$\text{ex:} \quad \alpha = (1 - Vs/Vrate)$$
$$= (1 - 0.01 \times Vs),$$

a maximum on-period correcting process ST3 according to a following equation:

$$\text{ex: ton\#max} = (\text{ip\#max}/Vrate \times L) \times \alpha$$

wherein the parenthesized term is a constant, a reading process ST4 for the detection value of the surface temperature of the heating roller, a discrimination process ST5 for discriminating whether the detection temperature<the target temperature, and, in case of negative result, a PWM output stopping process ST6 according to following equations:

$$\text{ex: } TM \times PR = 10$$
$$T \times CMPR = 20$$

whereupon the sequence returns to ST1.

In case the result of the discrimination of ST5 is affirmative, the sequence proceeds to a target electric power calculating process ST7 by:

$$\text{ex: (target temp.−detected temp.)} \times PK$$

PK: required electric power per unit temperature.

Then there are executed a reading process ST8 for the detected value of the coil current, a supplied power calculating process (input voltage×coil current) ST9, and an on-period (drive frequency) calculating process ST10 by:

$$\text{ex: ton\#op} = (\text{target power−supplied power}) \times (1/\text{maximum suppliable power}) \times \text{Gain}.$$

Subsequently there is executed an off-period correction calculating process ST11 by:

$$\text{ex: ton\#op} = \alpha \times \text{supplied power} \times (1/\text{maximum suppliable power}) \times \text{toff\#max},$$

then a discrimination is made whether ton#op>ton#max, and, in case of an affirmative result, there are executed a maximum on-period setting process ST13 by:

$$\text{ton\#op} = \text{ton\#max}$$

and a PWM setting process ST14 by:

$$\text{ex: } TM \times PR \text{ ton\#op}$$

$$T \times CMPR = \text{toff\#op}$$

which is also executed in case of a negative discrimination, whereupon the sequence returns to ST1.

In the foregoing there has been explained a digital control method by a software, but there can also be realized a digital control by a hardware.

In this manner the maximum on-period can be set according to the input voltage prior to the start of the on-off drive of the semiconductor switching element 123, thereby preventing the excessive current in the semiconductor switching element 123 and also preventing the application of an excessively large resonance voltage, resulting from such current, to the semiconductor switching element 123. Also in the course of the heating operation, the zero voltage switching is executed in secure manner by referring to the input voltage and the supplied electric power in succession, thereby preventing unnecessary power loss and also preventing the deterioration or destruction of the semiconductor switching element 123 by heat generation.

(Embodiment 3)

The present embodiment is same in configuration as the embodiment 1 but is different therefrom in that the ordinary PWM control is shifted to an intermittent control according to the detection value of the surface temperature of the heating roller 101 in case the supplied electric power becomes equal to or less than a specified value. The present embodiment is to cope with a following situation.

In case the surface temperature of the heating medium shows only a small change, as in a stand-by state, the electric power supplied to the coil is extremely small, so that, in case of current supply with such supplied electric power, the zero voltage switching becomes even more difficult since the resonance is insufficient. Though it is possible to wait until the surface temperature of the heating roller is so lowered that an electric power enabling a sufficient resonance can be supplied, but, if an image forming command is given in such state, there will result a long waiting time and there may also result an image defect such as an insufficient fixing for example in case of an environment where the fixing conditions are difficult to be satisfied. Such situation occurs because the zero voltage switching by the LC resonance function requires an electric power of at least a certain level.

Therefore, the present embodiment is to supply a minimum electric power necessary for the resonance, thereby enabling the zero voltage switching and avoiding the above-mentioned image defect.

The resonance condition is same as that in the embodiment 2, but it is necessary to determine the supplied electric power meeting the requirement.

Figure 10:
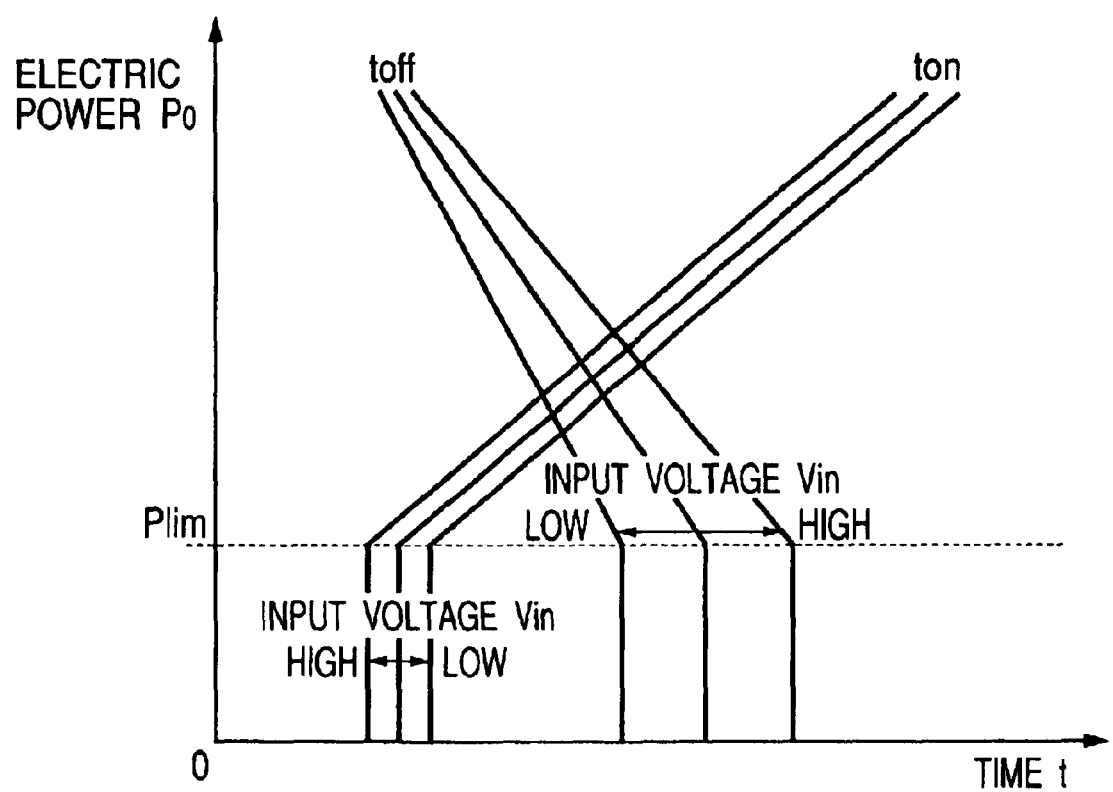
FIG. 10 is a chart showing a change in on-off periods of the electric power supply as a function of an input voltage in an embodiment 2.

FIG. 10 shows the relationship between the electric power supplied to the coil in the embodiment 2 and the on- and off-periods of the semiconductor switching element 123.

There is adopted a configuration, in case of a heating operation at or lower than a specified electric power Plim, of setting a minimum on-period capable of securing a resonance energy enabling the zero voltage switching, also setting a maximum off-period enabling the zero voltage switching in such situation, executing operation under fixed settings, interrupting the operation when the detected temperature becomes equal to or higher than the target temperature and re-starting the operation when the detected temperature becomes equal to or lower than the target temperature, or becomes equal to or lower than a target lower limit temperature defined with a certain range.

Figure 11B:
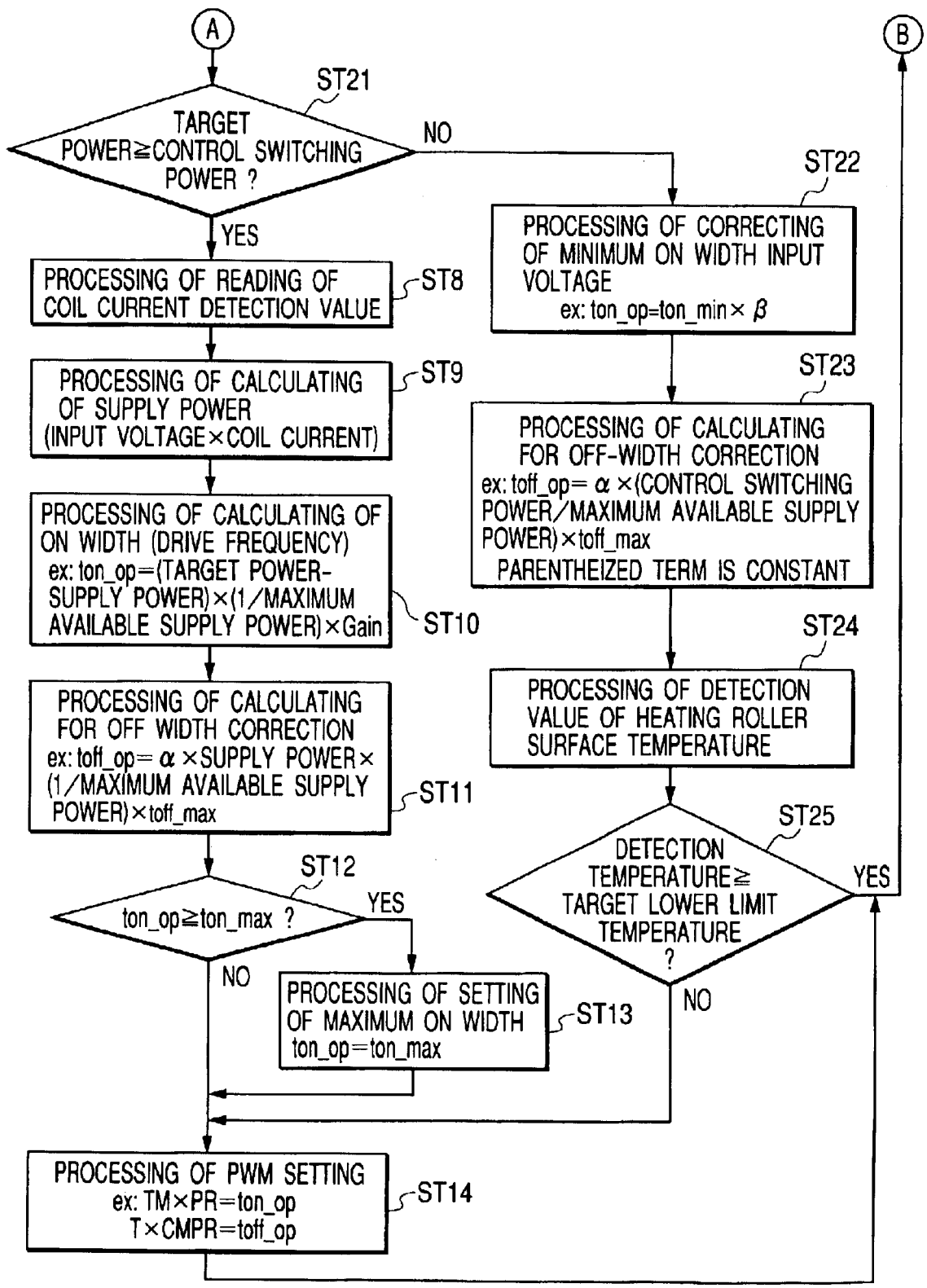
FIG. 11 is comprised of FIGS. 11A and 11B showing flow charts of the control procedure of the embodiment 2.

Such control is realized by a process of a flow chart shown in FIGS. 11A and 11B. The process shown in FIGS. 11A and 11B is provided with a step ST21 for discriminating whether the target electric power>a control switching electric power, after the step ST7 in the flow chart shown in FIG. 9. In case the target electric power is large, there is executed a process from the step ST8 to the step ST14 in FIG. 9, and, in case the control switching electric power is large, there are executed a minimum on-period input voltage correcting process ST22 by:

ex: ton#op=ton#in×β, then an off-period correcting process ST23 by:

ex: toff#op=α×(control switching electric power/maximum suppliable electric power)×toff#max wherein the parenthesized term is a constant, then a reading process ST24 for the detected value of the surface temperature of the heating roller and a discriminating step ST25 whether detected temperature>target lower limit temperature, and the sequence returns to the step ST1 in case of an affirmative result but proceeds to the step ST14 in case of a negative result.

In this manner it is rendered possible to eliminate an area in which the zero voltage switching is impossible because the resonance energy cannot be obtained, thereby realizing a heat fixing apparatus of an improved efficiency.

As explained in the foregoing, the present invention provides a fixing apparatus in which an induction heating power source includes input voltage detection means provided in an input portion of a commercial AC power source, switching means for generating a high frequency current, resonance means composed of a capacitor and an excitation coil, current detection means for detecting the high frequency current generated by the switching means, switch drive means for driving the switching means, and temperature detection means for detecting the temperature of a heating roller, wherein electric power control means for controlling on- and off-periods of the switching means based on the temperature detected by the temperature detection means is provided with a function of correcting the on- and off-periods according to the input voltage detected by the input voltage detection means, thereby preventing the application of excessive current and voltage resulting from a variation in the input voltage to the semiconductor switching element, and also is capable of suitably regulating the off-period and the on-period according to the input voltage, thereby realizing a fixing apparatus of a high efficiency with a reduced electric power loss. Also a secure improvement in the electric power loss in the semiconductor element allows to prevent deterioration of the reliability of the equipment for example by heat generation.

According to the invention, the electric power control means is controlled in digital manner thereby achieving highly precise control.

Also according to the invention, the digital control is executed with a digital signal processor, thereby enabling a highly precise control by a software.

According to the invention, a current is induced in a coil by charging and discharging of a capacitor connected electrically parallel to the coil, to achieve heat generation in the heating medium, thereby attaining effective utilization of energy. Also according to the invention, in case the difference between the surface temperature of the heating medium and the target temperature becomes large, a current supply may be executed anew to the coil thereby providing an effect of maintaining the surface temperature of the heating medium by a simple configuration.

Also according to the invention, a secure zero voltage switching can be realized by selecting an optimum off-period based on the voltage and the electric power, thereby suppressing the power loss in the semiconductor switching element, avoiding deterioration or destruction of the element by heat generation, and achieving an improvement in reliability and an electric power saving in the entire copying apparatus.

Furthermore, the present invention provides effects of realizing a heat fixing apparatus of a high efficiency with a reduced electric power loss, preventing the deterioration of reliability of the equipment by heat generation, and enabling constantly stable heat fixation process.

Furthermore, the present invention provides effects of preventing the deterioration of reliability of the equipment by heat generation, and enabling constantly stable printing operation in precise manner.

The invention has been explained by embodiments thereof, but the invention is by no means limited by such embodiments and is subjected to any and all modifications within the technical scope of the present invention.

What is claimed is:

1. A fixing apparatus comprising:
   a coil for generating a magnetic field;
   a heating medium having an electroconductive layer which generates heat by an eddy current by the magnetic field generated by said coil, and adapted to fix an unfixed toner image on a recording material by heat;
   a semiconductor switch element for executing an on-off current supply to said coil;
   a capacitor connected electrically parallel to said coil and executing charging and discharging;
   current supply control means for controlling an on-period in one cycle period of said semiconductor switch element so that a temperature of the heating member becomes a target temperature;
   voltage detection means for detecting an input voltage from a commercial alternating current power source; and
   setting means for setting an off-period possible to switch on said semiconductor switch element after switching off on the basis of the input voltage from said commercial alternating current power source.

2. A fixing apparatus according to claim 1, wherein said setting means corrects the off-period so that the off-period becomes longer when the detected voltage significantly increases.

3. A fixing apparatus according to claim 2, wherein a maximum on-period in one cycle period is determined in accordance with the detected voltage.

4. A fixing apparatus according to claim 3, wherein the maximum on-period becomes short when the detected voltage is large.

5. A fixing apparatus according to claim 1, further comprising rectifying means for rectifying a commercial alternating voltage.

6. A fixing apparatus according to claim 1, wherein said semiconductor switch element is connected electrically serially to the parallel electrical circuit of said coil and said capacitor.

7. A fixing apparatus comprising:

a coil for generating a magnetic field;

a heating medium having an electroconductive layer which generates heat by an eddy current by the magnetic field generated by said coil, and adapted to fix an unfixed toner image on a recording material by heat;

a semiconductor switch element for executing an on-off current supply to said coil;

a capacitor electrically parallel to said coil and executing charging and discharging;

current supply control means for controlling an on-period in one cycle period of said semiconductor switch element so that a temperature of the heating member becomes a target temperature;

voltage detection means for detecting an input voltage from a commercial alternating current power source; and setting means for setting the on-period in one cycle period so that electric power supplied to said coil becomes equal to or greater than a predetermined lower limit value.

8. A fixing apparatus according to claim 7, wherein the minimum on-period is determined according to the voltage detected by said voltage detection means.

9. A fixing apparatus according to claim 8, wherein an intermittent operation is executed with said minimum on-period and an off-state in case the electric power supplied to said coil is equal to or less than a predetermined value.

10. A fixing apparatus according to claim 9, wherein the minimum on-period is decreased in case the voltage detected by said voltage detection means becomes larger.

11. A fixing apparatus according to claim 8, further comprising rectifying means for rectifying a commercial alternating voltage.

12. A fixing apparatus according to claim 8, wherein said semiconductor switch element is connected electrically serially to the parallel electric circuit of said coil and said capacitor.

* * * * *

UNITED STATES PATENT AND TRADEMARK OFFICE
CERTIFICATE OF CORRECTION

PATENT NO.    : 6,799,002 B2  
DATED         : September 28, 2004  
INVENTOR(S)   : Takashi Birumachi It is certified that error appears in the above-identified patent and that said Letters Patent is hereby corrected as shown below:

Drawings,  
Sheet No. 6, Figure 7, "TEMPERATUR" should read -- TEMPERATURE --.  
Sheet No. 7, Figure 9, "PARENTHEIZED" should read -- PARENTHESIZED --; and "TEMPERATUDE" should read -- TEMPERATURE --.  
Sheet No. 9, Figure 11A, "PARENTHEIZED" should read -- PARENTHESIZED --; and "TEMPERATUDE" should read -- TEMPERATURE --.  
Sheet No. 10, Figure 11B, "PARENTHEIZED" should read -- PARENTHESIZED --.

Column 2,  
Line 22, "being" should be deleted.

Column 4,  
Line 29, "discharge etc." should read -- discharge, etc., --.

Column 8,  
Line 16, "resulting an" should read -- resulting in an --.  
Line 37, "restrict" should read -- restricts --.

Column 10,  
Line 51, "but," should be deleted.

Column 14,  
Line 22, "electric" should read -- electrical --.

Signed and Sealed this

First Day of February, 2005

JON W. DUDAS  
*Director of the United States Patent and Trademark Office*